United States Patent
Henry

[15] 3,696,901
[45] Oct. 10, 1972

[54] CENTRIFUGAL CLUTCH
[72] Inventor: Charles Frederick Henry, Carson, Calif.
[73] Assignee: McCulloch Corporation, Los Angeles, Calif.
[22] Filed: Oct. 30, 1970
[21] Appl. No.: 85,344

[52] U.S. Cl. ................... 192/105 BA, 192/105 CD
[51] Int. Cl. ............................................. F16d 43/24
[58] Field of Search...... 192/105 BA, 105 CD, 103 B, 192/75 R

[56] References Cited

UNITED STATES PATENTS

| 1,843,712 | 2/1932 | Else | 192/105 BA |
| 3,367,464 | 2/1968 | Fullerton et al. | 192/105 BA |
| 3,367,465 | 2/1968 | Newman | 192/105 BA |
| 3,429,411 | 2/1969 | Hazzard | 192/105 CD |

*Primary Examiner*—Benjamin W. Wyche
*Assistant Examiner*—Randall Heald
*Attorney*—Burns, Doane, Swecker & Mathis

[57] ABSTRACT

A centrifugal clutch including a U-shaped shroud which supports and partially houses a generally radially extending clutch shoe spring. The shroud cooperates with a clutch shoe mounting aperture to house and surround the spring, yet permit circumferential displacement of the clutch shoe relative to the shroud and a clutch hub. This circumferential displacement permits clutch hub carried cam means to exert clutching force on the clutch shoe, augmenting centrifugal clutching force acting on the clutch shoe.

5 Claims, 4 Drawing Figures

PATENTED OCT 10 1972 3,696,901

INVENTOR
CHARLES FREDERICK HENRY

BY *Burns, Doane, Swecker & Mathis*

ATTORNEYS

CENTRIFUGAL CLUTCH

BACKGROUND OF THE INVENTION

The centrifugal clutch art has developed, with consistent emphasis being placed on the production of clutches which were desirably capable of effective clutching and unclutching action, capable of maintaining high levels of clutching force, and desirably characterized by sustained operating life and minimal operating noises.

In attempting to accomplish these various desirable criteria, efforts have been made to provide improved arrangements for supporting and housing the spring mechanisms which serve to restore centrifugally actuated clutch shoes to their retracted positions.

For example, in U.S. Pat. No. 3,367,465, issued Feb. 6, 1968, and identifying A. K. Newman as inventor, an arrangement is disclosed where a U-shaped means or shroud is employed to confine and support a clutch shoe return spring. However, as disclosed in the Newman patent, each such shroud is disposed in sliding or telescoping engagement with internally apertured portion of a clutch shoe. While this arrangement may provide the desirable result of confining and completely housing the clutch return spring within the interior of the clutch shoe, it affirmatively prevents circumferential displacement of the clutch shoe relative to the clutch hub and causes driving loads to act on the shroud. In the absence of such circumferential displacement, the desirable cam induced augmentation of centrifugal clutching force, resulting for example from the clutch structure featured in the U.S. Pat. No. 3,429,411, issued Feb. 25, 1969, and identifying H. I. Hazard as inventor, may not be achieved.

Thus, the present invention is directed to a concept which enables the shroud-type, spring mounting arrangement of U.S. Pat. No. 3,367,465 to be effectively employed, while attaining the advantages of cam induced augmentation of centrifugal clutching action as yielded by the clutching mechanism of U.S. Pat. No. 3,429,411.

Surprisingly, these desirable aspects featured in U.S. Pats. Nos. 3,367,465 and 3,429,411 may be accomplished while departing from the teaching of U.S. Pat. No. 3,367,465 to the effect that the clutch spring and its shroud must serve to maintain the spring axes aligned with the center of mass of the clutch shoe. In departing from this prior art teaching, an added benefit results in that, to some extent, the displacement of a clutch shoe relative to the hub, as permitted by the shroud arrangement of the present invention, enables a restoring spring to develop an additional clutching force, tending to intensify or augment the aforesaid camming action.

OBJECTS AND SUMMARY OF THE INVENTION

It is a principal object of the invention to provide a centrifugally responsive clutch structure which synergistically integrates 1) an internal arrangement for confining and mounting a clutch restoring spring and 2) a cam arrangement for mechanically augmenting centrifugal clutching force.

It is a further object of the invention to provide such an integrated arrangement, the nature of which, at least to some extent, intensifies or enhances the camming action imparted to clutch shoe means.

It is therefore a general object of the present invention to provide a centrifugal clutch structure which effectively obviates or minimizes the drawbacks of previously developed clutches such as those noted above, while retaining desirable structural features.

It is another general object of the present invention to provide a centrifugal clutch which is relatively inexpensive to manufacture and install.

It is still another object of the present invention to provide a centrifugal clutch which enables the clutch shoes to be stably supported in both the retracted nonoperative and extended operative position.

It is yet another object of the present invention to provide a centrifugal clutch wherein the stability of the extended operative position of the clutch shoes is supplemented, at least to some extent, by increasing the pressure exerted by the clutch shoes.

In accomplishing these objectives, a combination is envisioned, in a centrifugal clutch, where a generally radially extending clutch spring is supported within a clutch shoe aperture by a shroud. The relationship between the shroud and the clutch shoe aperture is such as to permit circumferential displacement of the clutch shoe relative to the clutch hub and shroud when the clutch shoe is moved to an extended position in response to centrifugal force acting thereon. This circumferential displacement enables the clutch shoe to cammingly engage cam means carried by the clutch hub. The camming engagement exerts mechanical camming force on the clutch shoe, intensifying and intending to make more uniform the clutching force between the extended shoe and a clutch drum.

As an independently significant aspect of the invention, the displacement of the clutch shoe relative to the shroud and hub acts on the restoring spring so as to cause the restoring spring to impart a force on the clutch shoe, tending, at least to some extent, to augment the camming force.

At least some of the foregoing objects are accomplished by the provision of a preferred centrifugal clutch according to the present invention wherein a driving member is provided with a central hub portion from which emanate an equal plurality of sequentially interspersed arms and cam teeth. The arms may be formed with one end integral with the central hub and with the opposite end provided with a U-shaped, longitudinal projection opening in the direction of the hub. The cam teeth are provided at their outward ends with longitudinally extending and symmetrical, curved camming surfaces which engage corresponding longitudinally extending curved surfaces on two adjacent, centrifugally responsive clutch shoes disposed in the sectors between adjacent cam teeth. Each clutch shoe is provided, in addition to the longitudinally extending curved surfaces, with an outer arcuately extending clutching surface and midway between its corresponding longitudinally extending curved surfaces with a longitudinally extending cut out or opening, configured to receive the U-shaped projection. Disposed in the cut out between two transversely parallel surfaces of the U-shaped projection and the clutch shoe, respectively, is a compression spring which biases the clutch shoe generally radially inwardly until the corresponding longitudinally extending curved surfaces engage one each of the longitudinally extending and symmetrical curved camming surfaces of two adjacent sprocket teeth thereby establishing the retracted position of the clutch shoe, The cut out in each clutch shoe is sized to clear the surfaces of the U-shaped projection so that only the cam teeth transmit force from the driving member to the clutch shoe.

When the speed of the driving member, clutch shoe and compression spring assembly exceeds a predetermined value, the clutch shoe is caused to extend against the force exerted by the compression spring and to engage, along its outer arcuately extending clutching surface, the internal cylindrical clutching surface of a drum member to be driven. As the shoe is moving radially outwardly, one of the longitudinally extending symmetrical curved camming surfaces of the cam tooth, against which the clutch shoe was resting, is brought into clutch camming engagement with the corresponding longitudinally extending curved surface on the clutch shoe, As a result of relative circumferential displacement between the sprocket teeth and the clutch shoes, the center of mass of each clutch shoe no longer has the spring force passing therethrough and the lower portion of the spring becomes somewhat disconnected from absolute radial alignment with the axis of clutch rotation. This in turn creates a moment of the compression spring force which, at least to some extent, tends to aid the primary driving force exerted by the cam tooth against the clutch shoe and tends to increase the pressure exerted by at least a portion of the clutch shoe against the driven member.

BRIEF DESCRIPTION OF THE DRAWINGS

For a further and more detailed understanding of the present invention and the various additional objects and advantages accomplished thereby, reference is made to the following description and the accompanying drawings, wherein.

DETAILED DESCRIPTION OF THE PREFERRED EMBODIMENT

Detailed Structure

Figure 1:
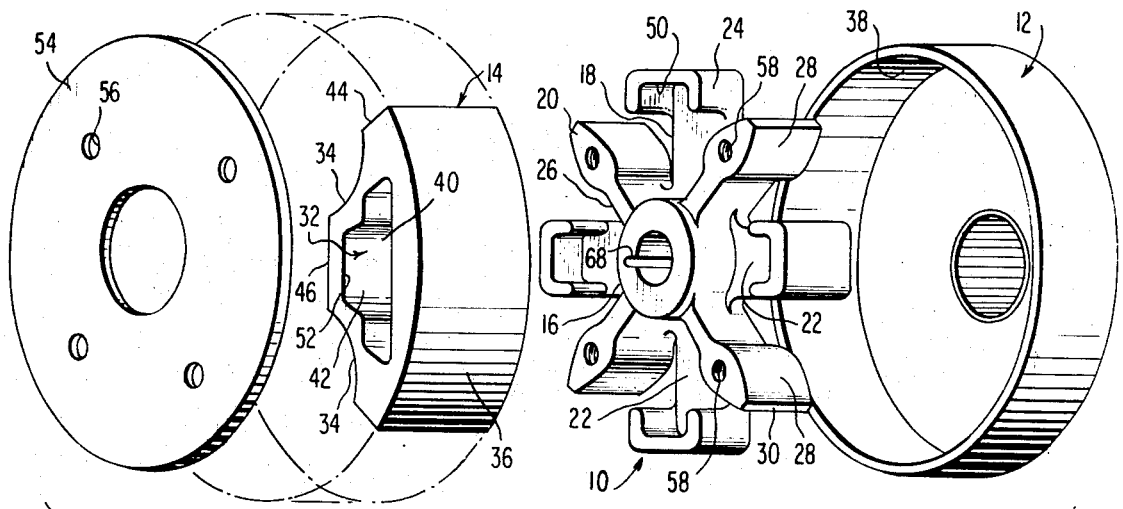
FIG. 1 is an exploded perspective view of a centrifugal clutch assembly in accordance with the present invention.

The preferred centrifugal clutch shown in the drawings, in which like numerals are used to indicate like parts throughout the various views thereof, basically comprises: a driving plate 10, a driven cylindrical drum 12 and force transmitting clutch shoes 14.

The driving plate 10 and clutch shoes 14 are mounted for rotation within the driven cylindrical drum 12. The driving plate 10 includes a cylindrical axially extending hub 16 from which a plurality of radially extending arms 18 project along with an equal plurality of radially extending cam teeth 20. The plurality of radially extending arms 18 and the equal plurality of radially extending cam teeth 20 are sequentially interspersed so that any two adjacent cam teeth along with the included arm form a sector for receiving one of the clutch shoes 14. The radially extending arms 18 are formed as elongated rectangular plates 22 with U-shaped projections or shrouds 24 extending longitudinally from the free ends thereof and opening in the direction of hub 16. The cam teeth 20 are formed as elongated rectangular ribs 26 with a pair of longitudinally extending and symmetrical curved camming surfaces 28. These curved camming surfaces exhibit a convexity in the transverse direction, termination at a flat surface 30 at the free end of the cam teeth.

Each clutch shoe 14 is formed as a symmetrical sector weight. Each shoe is provided with a cut out or opening 32 extending longitudinally therethrough, a pair of corresponding longitudinally extending curved surfaces 34 which exhibit a concavity in the transverse direction, and an arcuately extending clutching surface 36 which is adapted to mate with a facing and generally conforming portion of the internal cylindrical clutching surface 38 of the cylindrical driven drum 12. The symmetrical feature of the cam teeth and clutch shoes make it possible for the clutch to function by driving in either a clockwise or counterclockwise direction.

The longitudinally extending cut out or aperture 32 in the clutch shoe has, when viewed in cross-section, a radially outer rectangular portion 40 and a radially inner rectangular portion 42 situated with respect to each other in order to form a generally T-shaped configuration. This opening or aperture defines a pocket fully surrounding the shroud and spring, with clutch shoe portions being disposed radially between the spring and the clutch hub and clutch drum 12.

The outer rectangular portion has a more extensive transverse dimension than the inner rectangular portion for receiving therein the U-shaped longitudinally extending projections 24. The outer rectangular portion is further dimensioned so that the U-shaped longitudinally extending members 24 are circumferentially moveable within the walls defining said rectangular portion. It will be appreciated that other cut out configurations may be employed so long as such relative movement may take place.

The corresponding longitudinally extending curved surfaces 34 of the shoes 14 are joined to the arcuate clutching surface 36 by surfaces 44 and to each other by a surface 46 to thereby define the outer surface configuration of clutch shoe 14. The corresponding longitudinally extending curved surfaces 34 operationally cooperate with one of the longitudinally extending symmetrical curved camming surfaces 28 in a manner to be discussed hereinafter.

A compression spring 48 may be disposed in, and circumferentially and radially enclosed by, a pocket defined in part by transverse surface 50 of U-shaped projection 24 and transverse surface 52 of clutch shoe 14. The compression spring 48 operates to bias the clutch shoe 14 radially inwardly and out of engagement with the internal cylindrical clutching surface 38 of the cylindrical driven drum 12.

A disc-like plate 54 may be provided for operationally retaining the clutch shoes 14 around the U- shaped projections 24 and within the cylindrical space defined by the internal cylindrical clutching surface 38 of the drum 12. The retaining plate 54 may be provided with holes 56 for the insertion of threaded fastening means (not shown) which may project through the holes 56 and into threaded bore holes 58 formed longitudinally within the cam teeth 20. It will be appreciated that means other than threaded fastening means may be employed for attaching retaining plate 54.

Figure 3:
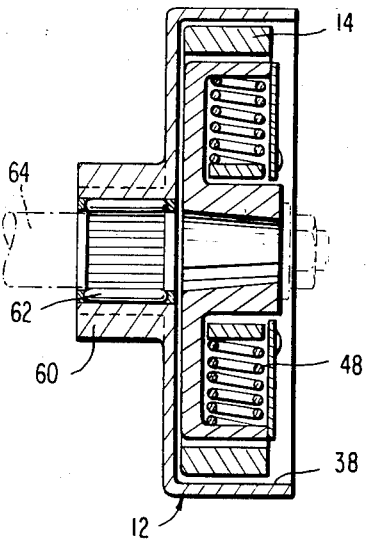
FIG. 3 is a view of an assembled centrifugal clutch according to the present invention taken along line 3—3 of FIG. 2.

Drum 12 is shown in FIG. 3 to be formed with a power take off shaft, sprocket, pulley or the like 60, which means 60 is rotatably supported on shaft 64 by bearing 62.

Figure 2:
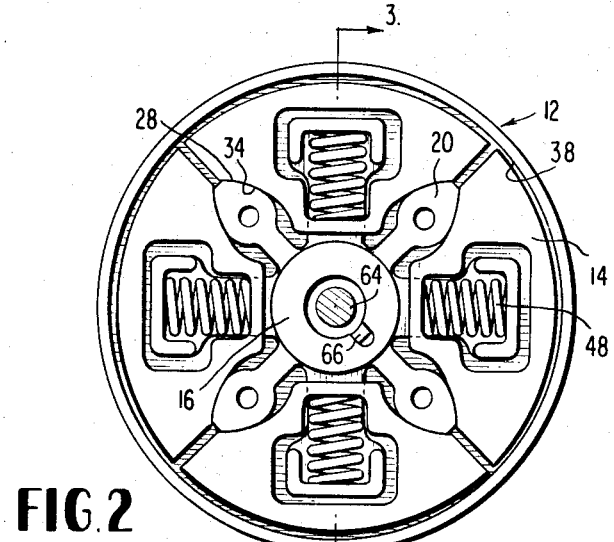
FIG. 2 is a plan view of a centrifugal clutch according to the present invention wherein the clutch shoes are in a retracted position.

The cylindrical axially extending hub 16 is seen in FIGS. 2 and 3 to be mounted for rotation on drive shaft 64 and to be retained thereon by a key 66 received in keyway 68. Again, it will be appreciated that other means of retaining hub 16 to drive shaft 64 may be employed.

Mode of Operation of the Clutch

As long as the drive shaft 64 is rotating below a predetermined clutching speed, the clutch shoes 14 of the assembly will be held in their stabilized, retracted positions with respect to the sectors defined above by the compression springs 48. When in the retracted position, both corresponding longitudinally extending curved surfaces 34 of the clutch shoes are in conforming engagement with longitudinally extending symmetrical curved camming surfaces 28 of two immediately adjacent cam teeth 20. Stabilization in the retracted position is thus provided.

When the clutch actuating speed of the drive shaft 64 is attained, centrifugal force acting on the clutch shoes is sufficient to overcome the restraining effect of the coil springs 48 and cause the clutch shoes to move radially outwardly into clutching engagement. Thus, when this clutching speed is attained, the clutch shoes 14 will be extended radially, so as to bring arcuately extending clutching surface 36 into engagement with internal cylindrical clutching surface 38 of drum 12.

Figure 4:
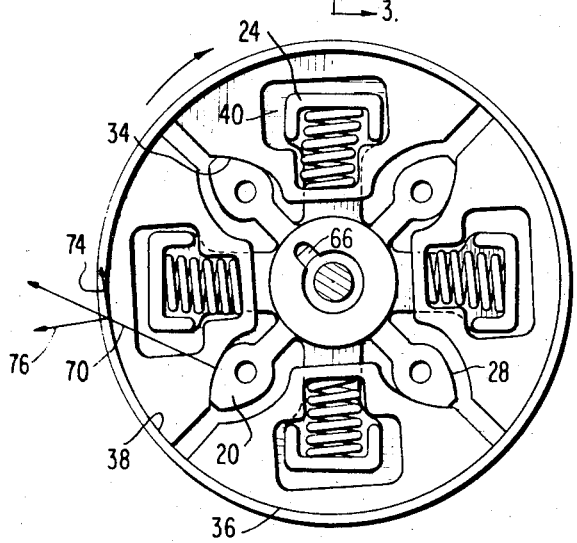
FIG. 4 is a plan view of a centrifugal clutch according to the present invention wherein the clutch shoes have moved radially outwardly under the influence of centrifugal force to engage the cylindrical clutching surface of the driven drum.

Due to the previously mentioned clearance provided for the U-shaped projections 24 within upper rectangular portion 40 of cut out 32, the driving plate 10 is permitted to rotate relative to the clutch shoe 14 until a longitudinally extending symmetrical curved camming surface 28 of a cam tooth comes into driving engagement with the corresponding longitudinally extending curved surface 34 of the adjacent, and then radially extended, clutch shoe next in position in the direction of rotation of driving plate 10. The engagement of the longitudinally extending curved camming surface 28 of the cam tooth with a corresponding longitudinally extending curved surface 34 of the clutch shoe takes place along substantially a plane of contact so that the tendency to pivot about a fulcrum point is substantially eliminated. Also, since the line of action of compression spring 48 is now offset from the center of mass of the clutch shoe, the spring force becomes available to aid in the clutching action of the clutch shoe against the drum 12 by creating a moment about the clutch shoe mass center which at least to some extent, adds to the moment created by the transmitted force of the cam teeth about the same mass center. This moment tends to cause clockwise rotation of the clutch shoes, as shown in FIG. 4, about the clutch shoe ends engaged by the drum and cam surfaces so as to intensify the camming action of the cam surfaces and "even out" clutch force circumferentially along surface 36.

The forces existing on the clutch shoe, when in its extended position, are the clutch shoe centrifugal force, the force resultant 70 (FIG. 4) imparted by tooth 20 to the internal cylindrical surface 38 through arcuately extending clutching surface 36, and additionally the moment force provided by the compression spring. The force resultant 70 comprises a radial component 76 and a tangential component 74. The radial component 76 supplements the centrifugal force, as does the moment force created by the spring, acting about the clutch shoe mass center, to increase the pressure between surfaces 36 and 38.

SUMMARY OF ADVANTAGES AND SCOPE OF THE INVENTION

As will thus be appreciated, the clutch mechanism of the present invention provides an effective shroud mechanism, in effect embedded within a clutch shoe, and operable to support and house a clutch shoe restoring spring. This arrangement enables the use of relatively small restoring springs, with the springs being effectively contained or protected within the interior of individual clutch shoes. During clutch action, the clutch force is not transmitted to the shroud mechanism.

This desirable aspect of the spring mounting arrangement is augmented by the ability of the clutch shoe to be circumferentially displaced relative to the shroud and hub. As a result of the ability of the clutch shoe to undergo such circumferential displacement, the benefits of clutch shoe camming action are obtained.

As an additional benefit, the very nature of the shroud arrangement, which permits circumferential displacement as heretofore described, causes the restoring spring, at least to some extent, to produce an intensification of augmentation of the camming action.

The unobviousness of the combination concept of the invention is reflected by prior patents such as U.S. Pat. No. 3,367,465, which discloses a restoring spring, shroud arrangement which affirmatively prevent the desirable camming action yielded by the present invention.

Further evidence of unobviousness results from the fact that in departing from the teaching of patents such as U.S. Pat. No. 3,367,465 produces not only an ability to effect the desirable camming action, but also causes the shroud housed restoring spring to intensify, to some extent, the camming action and relieves the transmission of clutching force to the shroud.

It can thus be seen that a novel centrifugal clutch has been herein provided wherein clutch shoes independently move into engagement with a driven drum in response to a predetermined centrifugal force applied thereto, with the clutch shoes being supported in a generally stable manner in both the extended and retracted positions. By providing an individual spring for each clutch shoe which enhances the clutching action, and by providing driving or cam teeth with cam surfaces which correspond with curved surfaces on the clutch shoes so that the load transmission imparted by the driving teeth to the clutch shoes during the extended mode of operation of the clutch shoes is not generally confined to a point, the centrifugal clutch according to the present invention maintains stability while effectively utilizing the clutching surface area.

While what has been shown herein is a preferred embodiment of the present invention, it is of course understood that various modifications and changes may be made without departing from the invention. It is therefore intended to cover in the following claims all such modifications and changes as fall within the true spirit and scope of the present invention.

What I claim is:

1. A clutch mechanism comprising:
driving means including
  hub means, and
  cam means;
driven means including
  clutch drum means;
centrifugally responsive clutch shoe means carried by said driving means;
spring shroud means
  carried by said hub means, and
  disposed within an interior portion of said clutch shoe means, with internal wall portions of said clutch shoe means encircling but being radially and laterally spaced from said spring shroud means;
restoring spring means extending generally radially of said hub means and extending between said spring shroud means and said clutch shoe means and operable to bias said clutch shoe means to a retracted position;
said spring shroud means cooperating with said clutch shoe means to permit circumferential displacement of said clutch shoe means relative to said hub means;
said circumferential displacement of said clutch shoe means being operable to bring said clutch shoe means into camming engagement with said cam means, with said camming engagement being operable to exert force on said clutch shoe means tending to urge said clutch shoe means against said clutch drum means, and
substantially prevent the transmission of clutching force through said clutch shoe means to said shroud means;
said clutch shoe means, in a retracted condition thereof, being free of engagement with said shroud means and concurrently disposed in immediately operable camming engagement and nested cooperation with said cam means;
said internal wall portions of said clutch shoe means, when said clutch shoe means is in said retracted condition, being entirely separated from radially outermost extremity means of said shroud means, with said separation between said internal wall portions of said clutch shoe means and said radially outermost extremity means of said shroud means being operable to ensure that said shroud means does not impede said immediately operable camming engagement between said retracted clutch shoe means and said cam means;
said radial and lateral spacing between said shroud means and said internal wall portions of said clutch shoe means providing movement facilitating gap means displaced radially outwardly of, and on opposite circumferential sides of, said shroud means and operable to permit tilting of said clutch shoe means relative to said shroud means;
said movement facilitating gap means, displaced radially outwardly of, and on opposite circumferential sides of said shroud means, being further operable to permit said circumferential displacement of said clutch shoe means relative to said hub means concurrent with generally radial movement of said clutch shoe means relative to said hub means;
said tilting of said clutch shoe means relative to said shroud means being operable in combination with said movement facilitating gap means to permit said clutch shoe means to be disposed in an extended condition in clutched engagement with said clutch drum means and in camming engagement with said cam means and free of force transmitting engagement with said shroud means; and
said shroud means providing spring end retaining means operable to engage and retain radially outermost end means of said restoring spring means, with said spring end retaining means remaining continuously in disconnected relation with said clutch shoe means while said clutch shoe means is in said retracted and extended conditions and while undergoing any of said tilting, radial movement or circumferential displacement.

2. A centrifugal clutch comprising:
rotary drive means;
  a driving plate secured to said rotary drive means,
    said driving plate having a central hub portion about which a plurality of sequentially interspersed radially extending arms and cam teeth project,
    said plurality of radially extending cam teeth defining a plurality of clutch shoe receiving sectors,
    said plurality of radially extending arms each having connected to a free end thereof a U-shaped cantilever projection including a pair of spaced generally radially directed legs interconnected at the radially remote ends thereof with an integral transverse member;
rotary driven means,
  said rotary driven means having a cylindrical clutching surface;
a plurality of clutch shoes,
  each clutch shoe being operable for mounting within one of said plurality of clutch shoe receiving sectors,
  each clutch shoe having an arcuately extending clutching surface,
  each clutch shoe further having projection receiving wall means defining a longitudinally extending T-shaped opening and also having curved cam engagement surfaces symmetrically disposed with respect to said opening;
each of said U-shaped projections extending within a said projection receiving wall means and within a head portion of a said T-shaped opening defined thereby with radial clearance existing between the transverse member of said U-shaped projection and a radially outermost portion of said projection receiving wall means, and with simultaneous lateral clearance existing between said pair of said legs of said U-shaped projection and circumferentially spaced portions of said projection receiving wall means;

a plurality of compression springs,
  each spring being disposed with respect to one of said clutch shoes and one of said radially extending arms to effect a clutch shoe mounting whereby each of said plurality of clutch shoes is operably radially movable between a retracted and extended position,
  said arcuately extending clutching surface and said cylindrical clutching surface being brought into engagement during the radial extension of said clutch shoes,
  said plurality of arms, cam teeth and compression springs being circumferentially displaceable relative to said plurality of clutch shoes when said clutch shoes are proceeding toward an extended position to cammingly augment the clutching action between said plurality of clutch shoes and said cylindrical clutching surface without transmitting clutching force through said clutch shoe to said U-shaped cantilever projections;

said clutch shoes, in a retracted condition thereof, being free of engagement with said U-shaped projections and concurrently disposed in immediately operable camming engagement and nested cooperation with said cam teeth;

said projection receiving wall means of each clutch shoe, in the retracted clutch shoe condition, being entirely separated from radially outermost extremity means of a said U-shaped projection extending therewithin, with said separation between said projection receiving wall means and said radially outermost extremity means of said U-shaped projection being operable to ensure that said U-shaped projection does not impede said immediately operable camming engagement;

the radial and lateral clearances associated with each T-shaped opening and a U-shaped projection extending therewithin providing movement facilitating gap means displaced radially outwardly of, and on opposite circumferential sides of, said U-shaped projections and operable to permit tilting of said clutch shoes relative to said U-shaped projections;

said movement facilitating gap means being further operable to permit said relative circumferential displacement between said clutch shoes and said arms, cam teeth, and compression springs concurrent with generally radial movement of said clutch shoes relative to said hub portion;

said tilting of said clutch shoes relative to said U-shaped projections being operable in combination with said movement facilitating gap means to permit said clutch shoes to be disposed in an extended condition in clutched engagement with said cylindrical clutching surface and in camming engagement with said cam teeth and free of force transmitting engagement with said U-shaped projections; and said transverse members of said U-shaped projections providing spring end retaining means operable to engage and retain radially outermost end means of said compression springs, with said spring end retaining means remaining continuously in disconnected relation with said clutch shoes while said clutch shoes are in said retracted and extended conditions and while undergoing any of said tilting, radial movement or relative circumferential displacement.

3. A centrifugal clutch comprising:
a driving assembly operable to be connected to a rotary drive means;
a driven assembly operable to be connected to a rotary load means,
  said driven assembly and said driving assembly having coaxially aligned axes of rotation,
  said driven assembly including an internal cylindrical clutching surface facing inwardly toward the axis of rotation of said driven assembly;
said driving assembly including
  driving plate means comprising a central hub portion from which a plurality of radially extending arms and cam teeth project,
  said radially extending arms and cam teeth being sequentially interspersed about said central hub,
  each of said radially extending arms having a free end away from said central hub for supporting an inwardly facing U-shaped projection including a pair of spaced generally radially directed legs interconnected at the radially remote ends thereof with an integral transverse member,
each of said cam teeth having a free end away from said central hub with curved camming surfaces,
a plurality of clutch shoes mounted between adjacent cam teeth for movement between extended and retracted positions, each of said clutch shoes including
  an arcuately extending clutch surface facing outwardly away from the axis of rotation of said driving assembly,
  projection receiving wall means defining a longitudinally extending opening, having greater circumferential dimensions than said U-shaped projection, and
  curved cam engaging surfaces symmetrically disposed with respect to said opening,
each of said clutch shoes being disposed between adjacent sprocket teeth such that said U-shaped projection extends with clearance within said opening,
a plurality of compression springs,
one each of said compression springs being disposed between a radially inward facing transverse surface of one of said U-shaped projection means and a radially outward facing transverse surface of said clutch shoe means for biasing said clutch shoe means toward said central hub portion so that said curved cam engaging surfaces of said clutch shoe means are brought into abutting engagement with one each of the symmetrical curved camming surfaces of adjacent cam teeth to define a stable retracted clutch shoe position,
each of said clutch shoes being movable radially outwardly into an extended position in response to a predetermined speed of rotation of said rotary drive means, each longitudinally extending opening being dimensioned such that a radial clearance exists between the transverse member of a U-shaped projection extending within the opening and a radially outermost surface of the projection receiving wall means defining the opening, both in a retracted and extended clutch shoe position, and simultaneous lateral clearances exist between the pair of legs of the U-shaped projection extending within the opening and lateral surfaces of the projection receiving wall means defining the opening when the clutch shoe providing the opening is in either a retracted or extended position, each of said cam teeth, radially extending arms and compression springs being operable to move relative to each of said clutch shoes during said radially outward movement of each of said clutch shoes, with said U-shaped projections circumferentially displaceable within said clutch shoes, so that said arcuately extending clutching surface means of each of said clutch shoe means are disposed into engagement with said internal cylindrical clutching surface of said driven assembly, while one of said symmetrical curved camming surfaces of each of said cam teeth is brought into engagement with the curved cam engaging surface of one of said clutch shoe means next in the direction of rotation of said driving assembly without transmitting clutching force into said U-shaped projections, and each of said relatively moved compression springs exerts a force which is utilized to effect a more positive engagement of said arcuately extending clutching surface with said internal cylindrical clutching surface;

said clutch shoes, in a retracted condition thereof, being free of engagement with said U-shaped projections and concurrently disposed in immediately operable camming engagement and nested cooperation with said cam teeth;

said projection receiving wall means of each clutch shoe, in the retracted clutch shoe condition, being entirely separated from radially outermost extremity means of a said U-shaped projection extending therewithin, with said separation between said projection receiving wall means and said radially outermost extremity means of said U-shaped projection being operable to ensure that said U-shaped projection does not impede said immediately operable camming engagement;

the radial and lateral clearances associated with each longitudinally extending opening and a U-shaped projection extending therewithin providing movement facilitating gap means displaced radially outwardly of, and on opposite circumferential sides of, said U-shaped projections and operable to permit tilting of said clutch shoes relative to said U-shaped projections;

said movement facilitating gap means being further operable to permit said relative circumferential displacement between said clutch shoes and said arms, cam teeth, and compression springs concurrent with generally radial movement of said clutch shoes relative to said axis of rotation;

said tilting of said clutch shoes relative to said U-shaped projections being operable in combination with said movement facilitating gap means to permit said clutch shoes to be disposed in an extended condition in clutched engagement with said cylindrical clutching surface and in camming engagement with said cam teeth and free of force transmitting engagement with said U-shaped projection; and said transverse members of said U-shaped projections providing spring end retaining means operable to engage and retain radially outermost end means of said compression springs, with said spring end retaining means remaining continuously in disconnected relation with said clutch shoes while said clutch shoes are in said retracted and extended conditions and while undergoing any of said tilting, radial movement or relative circumferential displacement.

4. The cylindrical clutch according to claim 2:
wherein each of said plurality of springs is disposed with respect to one of said U-shaped projections and a clutch shoe when said U-shaped projection extends with clearance within said opening to exert a force on said clutch shoe.

5. The cylindrical clutch according to claim 2, wherein said cam teeth each have a free end away from said central hub toward which symmetrical curved camming surfaces extend, said clutch shoe curved surfaces engaging one each of the symmetrical curved camming surfaces of adjacent sprocket teeth thereby defining said retracted position, one of said symmetrical curved camming surfaces of one of said adjacent cam teeth reengaging with the curved surface of said clutch shoe next in the direction of rotation of said driving assembly while said arcuately extending clutching surface and said cylindrical clutching surface are brought into engagement thereby defining said extended position.

* * * * *